US010275816B1

United States Patent
Miller

(10) Patent No.: US 10,275,816 B1
(45) Date of Patent: Apr. 30, 2019

(54) SYSTEM, METHOD, APPLICATION AND VIRTUAL PLATFORM FOR GLOBAL INTERNET RADIO AND CREATIVE CONTENT SERVICE

(71) Applicant: MAP Records, LLC, Nashville, TN (US)

(72) Inventor: Daniel Scott Miller, Carthage, TN (US)

(73) Assignee: Mapp Records LLC, Nashville, TN (US)

( * ) Notice: Subject to any disclaimer, the term of this patent is extended or adjusted under 35 U.S.C. 154(b) by 348 days.

(21) Appl. No.: 15/183,463

(22) Filed: Jun. 15, 2016

(51) Int. Cl.
| | |
|---|---|
| *G06Q 30/00* | (2012.01) |
| *G06Q 30/06* | (2012.01) |
| *G06F 8/70* | (2018.01) |
| *G06Q 50/00* | (2012.01) |
| *H04W 4/21* | (2018.01) |
| *G06F 8/10* | (2018.01) |
| *G06Q 30/02* | (2012.01) |

(52) U.S. Cl.
CPC ........ *G06Q 30/0621* (2013.01); *G06F 8/10* (2013.01); *G06F 8/70* (2013.01); *G06Q 30/00* (2013.01); *G06Q 30/02* (2013.01); *G06Q 30/0601* (2013.01); *G06Q 30/0641* (2013.01); *G06Q 50/01* (2013.01); *H04W 4/21* (2018.02)

(58) Field of Classification Search
CPC ........ G06Q 30/06; G06Q 30/0601–30/0643; G06Q 30/08; G06Q 50/01; H04W 4/21; G06F 8/10
See application file for complete search history.

(56) References Cited

U.S. PATENT DOCUMENTS

| | | | | |
|---|---|---|---|---|
| 9,674,660 | B1 * | 6/2017 | Vaynblat | G06Q 30/0261 |
| 2010/0114739 | A1 * | 5/2010 | Johnston | G06Q 30/06 705/26.1 |
| 2011/0055247 | A1 * | 3/2011 | Blumberg | G06F 17/3087 707/769 |
| 2012/0323716 | A1 * | 12/2012 | Matthews | G06Q 30/06 705/26.1 |
| 2015/0262151 | A1 * | 9/2015 | Enzminger | G06Q 30/06 705/26.1 |

OTHER PUBLICATIONS

How to: Create a Myspace Band Page. https://www.digitaltrends.com/how-to/how-to-create-a-myspace-band-page/. Jun. 5, 2007. (Year: 2007).*

* cited by examiner

*Primary Examiner* — William J Allen
(74) *Attorney, Agent, or Firm* — Hanrahan Law Firm, P.A.; Benjamin M. Hanrahan

(57) ABSTRACT

A global internet radio and creative content service in the form of one or more mobile-based applications providing fans and other users the opportunity to interact with, connect with or otherwise obtain information corresponding to one or more artists or entertainers is presented herein. The system, method and platform of certain embodiments may provide mobile-based record label, content distribution services and features, among others, including, for example a mobile-based music broadcasting and recording company or service. Particularly, a main application is provided which links to a plurality of artist-specific sub applications. The sub applications are customized by the artist or entertainer and provide access to various revenue generative features, including, the distribution of the artist's or entertainer's creative content, such as music and videos.

10 Claims, 6 Drawing Sheets

SYSTEM, METHOD, APPLICATION AND VIRTUAL PLATFORM FOR GLOBAL INTERNET RADIO AND CREATIVE CONTENT SERVICE

FIELD OF THE INVENTION

The present invention is generally directed to a global internet radio and creative content service in the form of one or more mobile-based applications providing fans and other users the opportunity to interact with, connect with or otherwise obtain information corresponding to one or more artists or entertainers. The system, method and platform of certain embodiments may provide mobile-based record label, content distribution services and features, among others, including, for example a mobile-based music broadcasting and recording company or service.

BACKGROUND OF THE INVENTION

Many artists, entertainers, etc., including but not limited to musical artists, actors, and actresses, have high levels of talent in terms of providing high quality entertainment and creative content, however, they often have difficulty starting and maintaining a successful career. There are many record labels and publishing companies that sign artists and provide services that are intended to start, enhance or maintain an artist's career. However, oftentimes, these traditional record labels and publishing companies are difficult to coordinate with, in that the entertainers or artists may have a difficult time obtaining access to the record label and publishing companies, and in many cases, existing record labels and publishing companies will release content or authorize the release of content in traditional manners, for example, via the radio or in store sales.

With the proliferation of mobile devices and ubiquitous manner in which mobile devices are used today, there is exists a need for a mobile-based creative content distribution platform in which artists and entertainers can develop unique applications or modules in order to control the release of certain creative content and to generate revenue therefrom. The proposed system and method would provide the artists and entertainers greater control of their own brand, control on how to connect with fans, and will provide a number of features and manners in which the artists' and entertainers' can generate revenue. This will provide the artist and entertainer with greater control over his or her content, career, and social media accounts.

SUMMARY OF THE INVENTION

The various embodiments of the present invention are directed to one or more mobile applications, system and/or methods that provide internet radio and creative content distribution services. A managing entity or record label company can sign new and marquee artists and entertainers, produce and procure music and video content, provide in-house services such as A&R, audio and video production, publishing, etc., as well as provide additional features many of which are revenue generating features such as sales of merchandise, sales of creative content and sales of ticket for live events, among others.

In particular, the system, method and platform of certain embodiments of the present invention will provide direct access to the music industry and will offer fans and other users the ability to connect with the artists and entertainers, in real time. The method and system may put the artists' or entertainers' career in their control and will aim to increase profit margins by linking all sales of music, videos, merchandise and tickets to their financial accounts.

Particularly, the system and method may include a main application and a plurality of customized artist-specific sub applications. For instance, each of the sub application will be customizable by the entertainers and will include features, include revenue generating features, selected by the entertainer. Some of the various revenue generating features or streams may include traditional radio, internet radio (e.g., pay per spin model), purchase of single songs or albums, purchase of in-app videos, blogs, and other social media content, online stores, sales of merchandise, etc.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
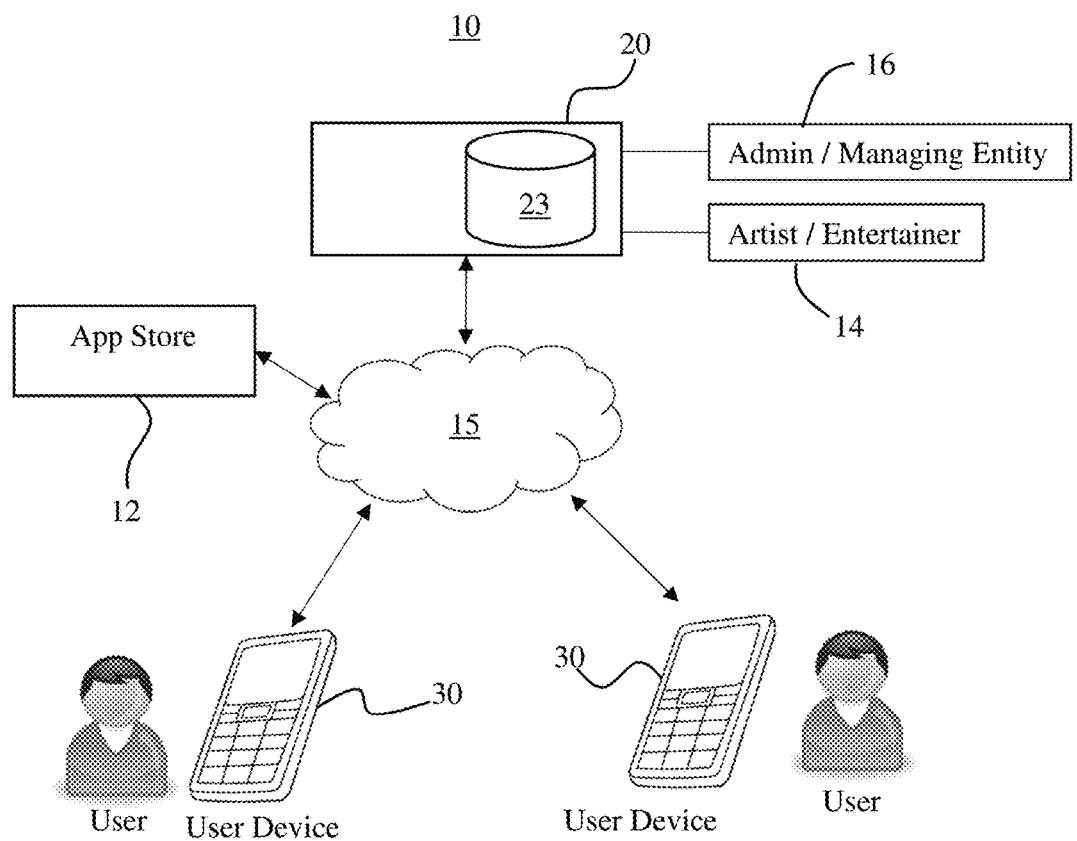
FIG. 1 is a schematic representation of the system as disclosed in accordance with at least one embodiment of the present invention.

As shown in the accompanying drawings, and with reference to FIG. 1, for example, the present invention is directed to a system 10 and method 100 for providing or distributing creative content, including, but in no way limited to music, audio, video, artwork, and other media, multimedia, etc. For example, as described herein, the present invention may include one or more mobile applications, such as a main application 40 and a plurality of sub applications 50, available for download or otherwise accessible via one or more user devices 30.

Specifically, with reference to the schematic or block diagram of FIG. 1, the system 10 of at least one embodiment includes a content management system 20 disposed in communicative relation with a plurality of user devices 30, for example, via a network 15. As an example, the network 15 may include virtually any computer, communication or data network such as the World Wide Web, Internet, Intranet, Wide Area Network(s), Telecommunication Network(s) (e.g., 3G, 4G, LTE), etc. Moreover, the content management system 20 of certain embodiments is structured to manage account or profile information (e.g., usernames, passwords, account information, contacts, etc.) and facilitate the creation, management, transmitting and/or distribution of creative content and other content via the one or more mobile applications 40, 50 as described herein.

Figure 2:
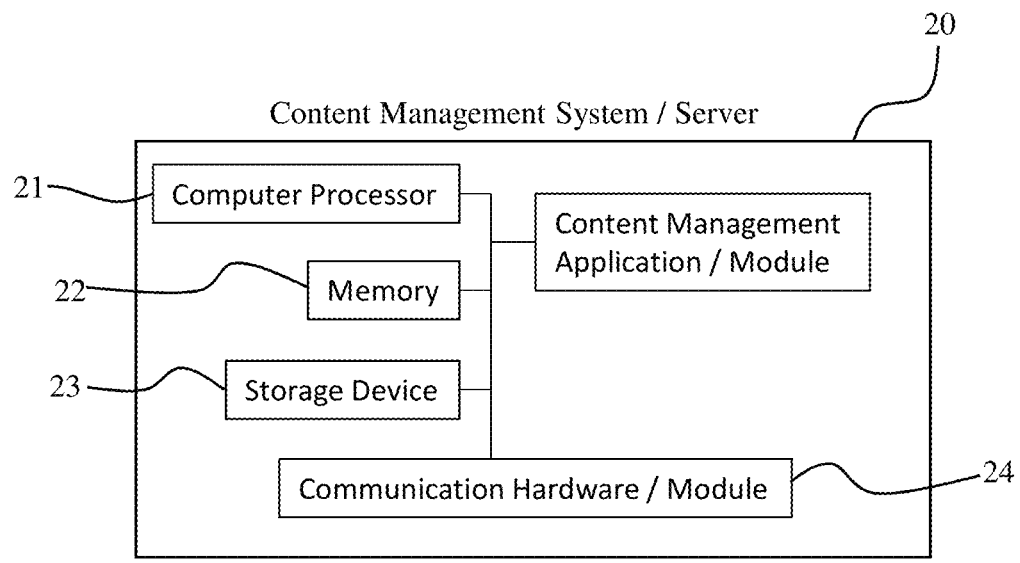
FIG. 2 is a block diagram illustrating some components of an exemplary content management system of the present invention.

For example, the content management system 20 of at least one embodiment the present invention may include a web or cloud-based computer or server, desktop computer, laptop computer, tablet, mobile or handheld computer, etc. capable of facilitating implementation of the present invention disclosed herein. Particularly, with reference briefly to the schematic representation or block diagram of the content management system 20 provided in FIG. 2, it is noted that the platform/system 20 of at least one embodiment includes, among other components and devices structured to facilitate implementation of the present invention in the intended manner, a computer processor 21, memory 22, a data storage device 23, and communication or network device(s) 24. Specifically, as used herein, the processor 21 of at least one embodiment may include any device cooperatively structured to execute or implement computer instructions, software, etc., including, for example, the various features and components as described in accordance with at least one embodiment of the present invention and configured to implement or facilitate the implementation of the method 100 herein. The data storage device 23, as used herein, may include a hard disk drive, CD/DVD, USB drive, solid state drive, virtual drive, could-based storage drive, or other types of volatile or non-volatile memory. Further, the memory device 22 as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. Moreover, the communication device 24 may include a network communication hardware/software component structured to facilitate communication between the content management platform/system 20 of the present invention and the various user devices 30.

Furthermore, the user devices 30 of certain embodiments or implementations of the present invention may include mobile devices such as, but not limited to mobile phones, smartphones, tablet computers, etc., although it is contemplated that the user devices 30 may also include laptop or mobile computers, desktop computers, video game consoles, mobile video game devices, etc. Accordingly, in some embodiments or implementations, the user or mobile device(s) 30 may include, for example, an APPLE® iPHONE®, ANDROID® based phone, etc. In any event, the user devices 30 of the various embodiments are capable of accessing one or more of the mobile applications 40, 50 described herein and accessing the various creative content and other content distributed by virtue of the present invention.

Figure 3:
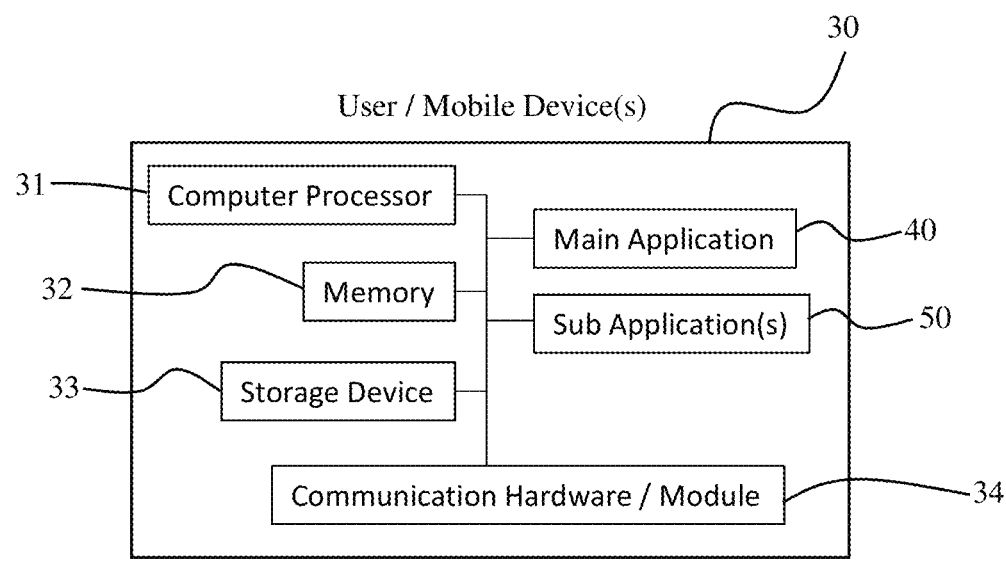
FIG. 3 is a block diagram illustrating some components of the user devices as disclosed herein.

With reference to the schematic representation or block diagram of at least one exemplary user device 30 as provided in FIG. 3, it is noted that the user device(s) 30 of at least one embodiment includes, among other components and devices structured to facilitate implementation of the present invention in the intended manner, a computer processor 31, memory 32, a data storage device 33, and communication or network device(s) 34. Furthermore, the mobile or user device(s) 30 may include a display (not shown), such as a touchscreen or other screen for displaying the creative or other content of the present invention.

Moreover, as used herein, the processor 32 of at least one embodiment may include any device cooperatively structured to execute or implement computer instructions, software, etc., including, for example, the various features and components as described in accordance with at least one embodiment of the present invention and configured to implement the method 100 herein. The data storage device 33, as used herein, may include a hard disk drive, CD/DVD, USB drive, solid state drive, virtual drive, could-based storage drive, or other types of volatile or non-volatile memory. Further, the memory device 32 as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. Moreover, the communication device 34 may include a network communication hardware/software component structured to facilitate communication with the network 15.

For instance, the user(s), which may include U.S., foreign, or international music fans, listeners, emerging artists or entertainers (e.g., in the audio, film, video, or print media fields), marquee artists, fans of entertainers, fans of athletes, or fans of any commercial business, may download one or more mobile applications, e.g., a main application 40 or sub application(s) 50, onto his or her mobile device or user device 30. In order to do so, in certain embodiments, the mobile application(s) 40, 50 may be made available directly via the content management system 20 or via a third party mobile application store or service 12, such as, the APPLE® App Store or GOOGLE PLAY® Store, as an example, Specifically, with reference to FIG. 4, in at least one embodiment, the present invention includes a main application, generally referenced as 40, which may be designed, customized or created by the content management entity or administrator(s) 16 of the content management system 20. In other words, the main application 40 is generally run by or created by the record label company that organizes the various system 10 and method 100 of the present invention.

The main application 40 of at least one embodiment may be configured to feature or display various news related information as well as promote or advertise events (such as concerts or live video streams) scheduled by or for one or more of the artists or entertainers 14. In addition, the maim application 40 of at least one embodiment will include button or icons corresponding to a plurality of different sub applications 50. As provided herein, the sub applications 50 are customized or at least partially designed by and/or for different artists or entertainers 14. For instance, each artist or entertainer 14 will have his or her own sub application 50 which can include various selected and customized features to engage the users or fans or otherwise to generate revenue for the artists or entertainer 14, and consequently, for the content management entity, as well.

As provided herein, the artist(s) or entertainer(s) 14 may include, for example, one or more recording artists, entertainers, athletes, actors, actresses, chefs, or other commercial business entities.

Figure 4:
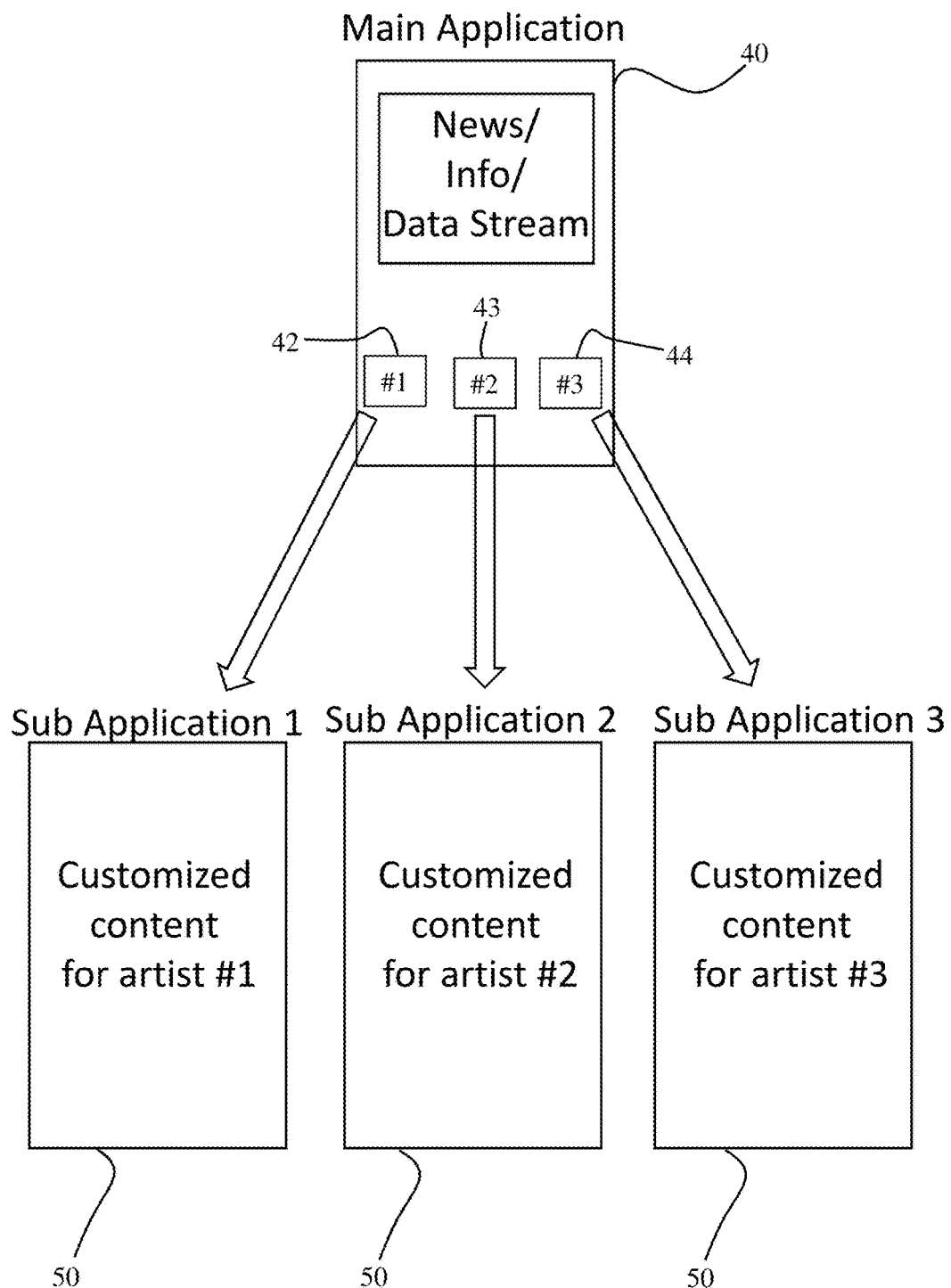
FIG. 4 is a schematic representation of the interaction between the main application and the plurality of sub application as disclosed in accordance with at least one embodiment of the present invention.

Still referring to FIG. 4, and as briefly mentioned above, the main application 40 of at least one embodiment may include one or more icons, buttons, etc., generally referenced as 42, 43, 44 which can direct the user or user device(s) 30 to one or more corresponding sub application 50 associated with a different artist or entertainer 14, for example. Particularly, by clicking on the icon or button 42, 43, 44 within the main application 40, in some embodiments, the user may be required to download a separate sub application 50, the sub application 50 being associated with the artist depicted on, represented by, or otherwise identified by the icon, etc. In some embodiments, however, the sub application 50 may not be a separate application, per se, but may instead include a separate or dedicated module, section, etc. of the main application 40 dedicated to the corresponding artists or entertainer 14.

As an example, music artist #1, music artist #2, and music artist #3 may each independently create a sub application 50 or sub module (which will provide content and other features, as described herein). The main application 40 of one embodiment will then display corresponding icons, lists, buttons, etc. allowing the user(s) to find the sub application(s) 50. Upon clicking on or otherwise selecting the icon, list, button, etc., 42, 43, 44, the user(s) will be directed to the sub application 50 corresponding to the particular artist, whether that means a separate application for download and installation, access to a separate or dedicated page or module of the main application 40, or access to a web page or other like content providing apparatus, device or means.

Figure 5A:
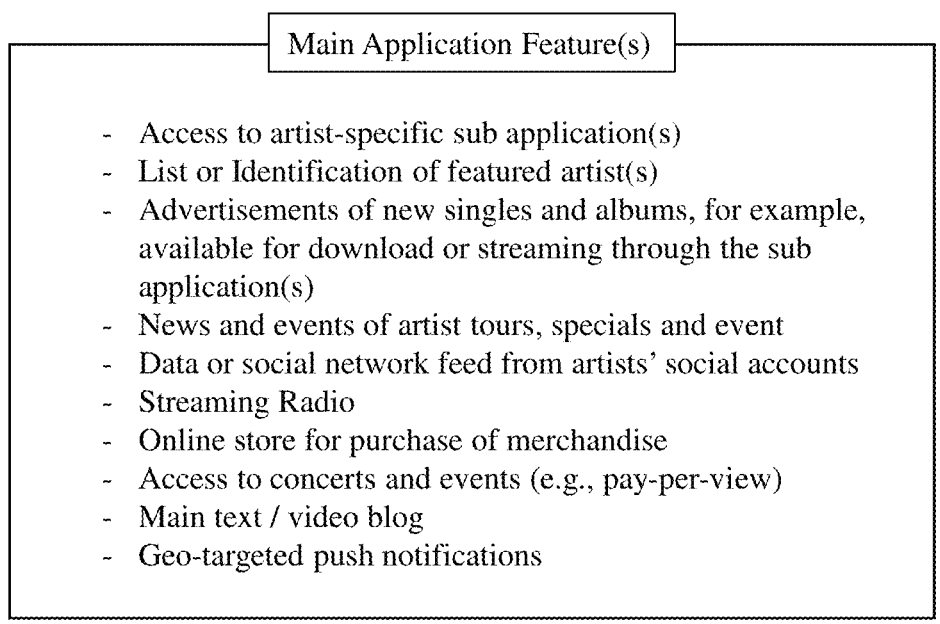
FIG. 5A is an exemplary listing of certain features available via the main application of at least one embodiment of the present invention.

Referring now to FIG. 5A, a list or identification of a plurality of features available for or which may be incorporated into the main application 40 is identified. For example, the main application 40 may include access to the sub application(s) 50, as provided above, wherein a user may simply click on or activate an icon or other like feature in order to access, open, be directed to, or launch the entertainer's own application, or sub application 50. Additional features of the main application 40 may include, but are not limited to, providing a list or identification of featured artists, providing advertisements of new singles or albums available through one or more of the sub applications 50, providing or identifying news and/or event tours, providing an artists feed, linking to or showing portions of the entertainers' social media accounts (e.g., TWITTER®, FACEBOOK®, INSTAGRAM®, etc.), providing a streaming radio that plays songs or music from one or more of the entertainers, providing a store or manner in which users can purchase merchandise, providing live content from one or more of the entertainers (e.g., pay-per-view concerts and events), providing a text or video blog and other main social media accounts, providing push notifications to the users (e.g., geo-targeted push notifications), etc.

With regard to the entertainer specific or sub application(s) 50, the present invention includes a plurality of features 52, 54 many of which are revenue generating features, meaning that the artist/entertainer 14, as well as the managing entity 16, may receive payments or revenue in exchange for providing some of the features or services to the one or more users, such as paid users, for example. In certain embodiments, the entertainer 14 is able to customize the sub application 50 to suit his or her needs and desires by selecting certain features 52, 54 for incorporation into the sub application 50. In some embodiments, the system 10 and/or method 100 of the present invention may allow the entertainer 14 to have direct access to a maintenance or application development team allowing the entertainer 14 and/or the development team to make any changes, updates, or customizations to the sub application 50 as needed or as desired. In some instances, this feature (e.g., providing direct access to an application development team) may be billed to the entertainer at an agreed monthly rate, paid annually, or on another agreed-upon schedule.

Furthermore, in at least one exemplary embodiments, for instance, wherein the entertainer 14 is a musician or music artist, the sub application 50 may allow the user(s) to preview the audio of one or more songs (e.g., by listening to a short snippet of the song). In this manner, the song(s) and/or audio/video content may be stored on the content management system 20 of at least one embodiment and streamed to the user device(s) 30, or the songs or other audio/video content may be stored on a third party server and streamed through the sub application(s) 50. For instance, the content may be stored and/or at least partially managed or streamed from APPLES iTUNES®, AMAZON®, or other music service.

Additional features of the sub application(s) 50 may include providing an online or mobile store where users can purchase merchandise associated with the artist or entertainer, information relating to events (e.g., touring events) associated with the artist or entertainer, and/or push notifications (e.g., geo targeted push notifications) of events associated with the artists or entertainer. Many of these above-noted features may be available for free to the users on all of the sub application(s) 50 or at least available for the artists or entertainer to select and incorporate into his or her sub application 50, if so desired.

Further features of at least one embodiment of the present invention include defining a plurality of content levels 61, 62 in which the entertainer 14 can select when developing his or her sub application 50. The content levels 61, 62 provide a different set of features 52, 54 available for the entertainer 14 to incorporate into the sub application 50. Specifically, the entertainer 14 may select one of the plurality of content levels, such as, for example, a first tier 61 or a second tier 62, and pay the corresponding fee, or otherwise agree to pay the corresponding fee. For example, in at least one embodiment, the first tier 61 may include a first set of features 52 and the second tier 62 may include a second set of features 54 available for incorporation into the sub application. In some cases, the second tier 62 may also include the set of features 52 available in the first tier, plus the additional second tier features 54.

Particularly, the entertainer 14 may select a tier or content level, agree to the corresponding payment terms, and then the corresponding features for the selected tier will be associated with or available for incorporation into the corresponding sub application 50. As just an example, the first tier 61 may allow the entertainer to use one or a limited set of templates for the sub application 50, specifically, templates that define the layout, look and feel, etc. of the sub application 50. Whereas, the second tier 62 may allow the entertainer 14 to develop a customized layout or customized application without being limited to one or more specific templates. It should also be noted that in this example, the fee or required payment for the first tier 61 or first content level is less than the fee or required payment for the second tier 62 or second content level. As an example, the first tier 61 fee may include a creation fee (e.g., $1,500) plus a monthly fee (e.g., $220), and the second tier 62 may include a greater creation fee (e.g., $3,000) plus a greater monthly fee (e.g., $320.00). Of course, these fees are simply provided for exemplary purpose only and should not be deemed limiting in any manner. Similarly, the various embodiments of the present invention may include more or less content levels with different set(s) of features available for use or incorporation into the sub application 50.

Figure 5B:
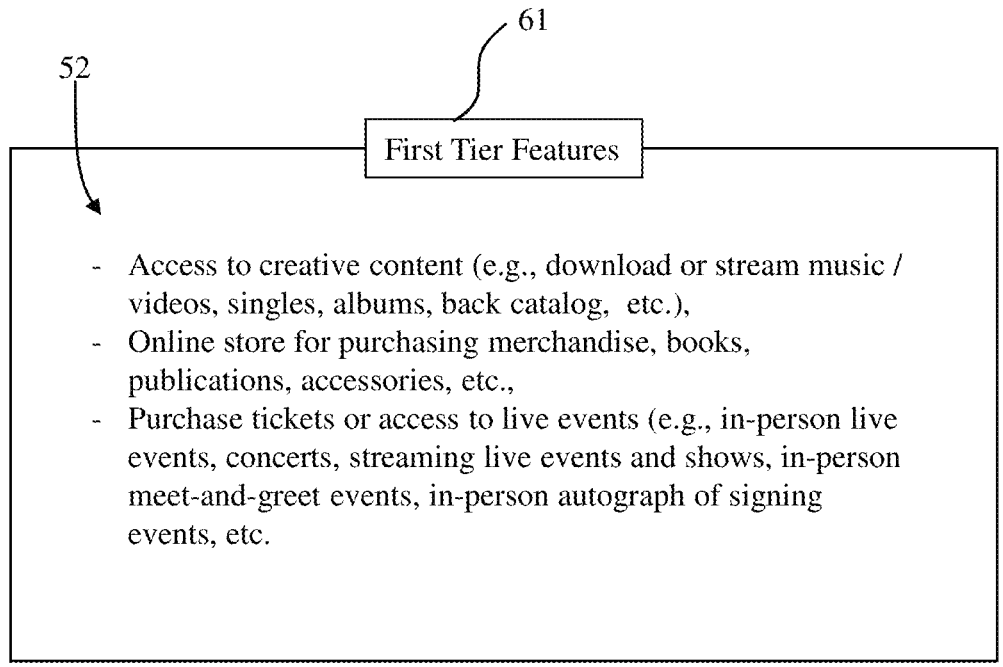
FIG. 5B is an exemplary listing of certain features available via the first tier of the sub application as disclosed in accordance with at least one embodiment herein.

In any event, with reference to FIG. 5B, at least one embodiment of the present invention includes a first set of revenue generating features, or features that may be used to generate fees or revenue form the various users. The entertainer 14 may choose to incorporate none, some or all of these features into the sub application 50. For example, in one embodiment, the first set of revenue generating features 52 may include providing creative content such as music available for download or available for streaming, for instance, in exchange for payment. Particularly, the user may choose to download a single song from the sub application 50 or a full album, or may choose to stream the audio rather than downloading the audio or music to the user device 30.

Additional revenue generating features, which in some embodiments may be made available in the first tier or first content level, may include providing an online or mobile store allowing the user(s) to purchase merchandise or other items associated with or corresponding to the artists or entertainer, including, but in no way limited to books, publications, apparel (e.g., shirts, hats, and other clothing), accessories, etc.

Additional revenue generating features, which in some embodiments may be made available in the first tier or first content level, may include providing live content available for purchase—the live content may include, for example, tickets for live in-person events (e.g., live concerts, in-person meet-and-greets, in-person signing events, etc.), or content available for viewing via the sub application 50 or user device(s) 30, such as, for example, live streaming events, concerts, shows, interviews, etc.

With regard to the second tier or second content level, in at least one embodiment, if the sub application 50 is associated with or assigned to the second tier, as selected and customized by the entertainer 14, then in some cases, the users may need to sign up for a subscription or pay a fee to access the sub application 50. This provides an additional source of revenue in addition to the revenue generating features 52, 54 that the entertainer can select and incorporate into the application.

Figure 5C:
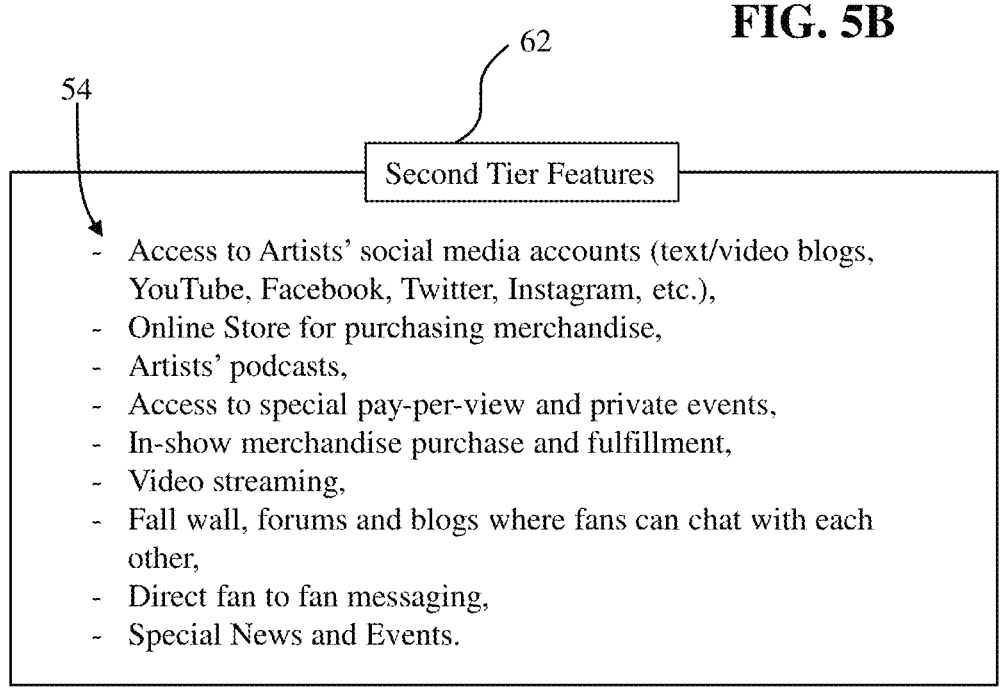
FIG. 5C is an exemplary listing of certain features available via the second tier of the sub application as disclosed in accordance with at least one embodiment herein.

For example, with reference to FIG. 5C, a list of additional features which in some embodiments may only be made available in the second tier or second content level is shown. Particularly, the second set of features 54 may include, but is certainly not limited to, providing social media content associated with the entertainer (e.g., via a text or video blog, or providing content from third party social media accounts, such as, YOUTUBE®, FACEBOOK®, TWITTER®, INSTAGRAM®, etc.). Some further second tier features 54 may further include providing advertising space on the corresponding application 50 for displaying advertisements, banners, etc. from sponsors and other paid items. The revenue generated from the advertisements may be paid directly to the entertainer (or a portion paid to the entertainer), or the revenue may be used to reduce the entertainer's monthly fee, for example, for the second tier payment plan.

Additional features 54 available for the second tier or second content level may include providing users access to autograph signing events, e.g., pre-show or before a scheduled concert, which can be listed or scheduled on the sub application 50. Some embodiments may require the users to pay additional fees for access to these events and some embodiments may only allow users who have access to the sub application 50 to have access to the events. Particularly, the system 10 and/or method 100 may generate a virtual ticket or other confirmation that can be made available on the sub application 50, which the user may present at the event for access.

Furthermore, in some embodiments, the users, via the user device 30 and sub application 50, may shop for and purchase merchandise and other items from the device 30 while attending a live event, such as a live concert. The purchase may be made from the user's seat, in the parking lot during the show, etc. using a credit or debit card, PAYPAL® or other like method of electronic payment. The system 10 and/or method 100 may receive the purchase request and send a push notification or other notification (e.g., text message, email, etc.) to the user, verifying the transaction is complete and that the item(s) is ready for pick up at a particular location (e.g., at a designated counter, office, stand, etc.) Other embodiments may deliver the item(s) to the users' seat, car, or other location whether at the show or remote (e.g., to the user's home or office).

As provided above, the entertainer 14 may selected one or more content levels or tiers with which to associate the corresponding sub application 50. The different tiers or content levels provide the entertainer with different revenue generating features or opportunities. In some embodiments, the system 10 and/or method 100 will share and distribute music, videos and other creative content with iTUNES, APPLE MUSIC, AMAZON, SPOTIFY, GOOGLE PLAY, PANDORA, DEEZER, TIDAL, and other like music distribution and streaming services.

In any event, the entertainer will pay a fee corresponding to the selected content level or tier—the fee may include a creation fee plus a monthly or other recurring maintenance fee. The managing entity 16, of certain embodiments, will retain a percentage or portion (e.g., 14%) of the revenue that is generated via the sub application 50, for example, through the revenue generating features described herein.

Furthermore, some embodiments may include or use cloud-based guided analytics, data visualization and predictive analytics that obtain and record data corresponding to the use of the applications 40, 50 and that makes understanding the analytics data easy. For instance, the analytics software and apparatus guides data exploration, automates predictive analytics and makes creating dashboards and info graphics easy. As an example, in one embodiment, the entertainer 14 may tap directly into social media data samples in order to bring social insights into career decisions or to connect to the analytic reports in order to better understand the data and trajectory of certain aspects of the entertainer's career. The analytics program, module or feature of at least one embodiment of the present invention may detect sentiments across forums, news feeds, blogs and various social media outlets. The data can be defined by themes searched, topics, various demographics, and geo located for specific geographical data.

As an example, there may be different tiers or levels of analytics available for the entertainer 14. For instance, GOOGLE ANALYTICS information or other like analytics information may be available under one tier, for example at no additional costs, whereas more in depth analytics information may be made available for additional fees (e.g., monthly) for the entertainer 14.

Moreover, it should be noted that some embodiments of the present invention are directed to mobile applications, systems, methods and platforms that provide traditional record label services that supports existing artists and entertainers through their existing catalog of creative content, created new content via video and audio, and helps develop new, emerging talent. Accordingly, some additional features of the system 10 and/or method 100 of some embodiments of the present invention may include, for example, an in-house or provided artist record production, in-house or provided artist video production, assistance with song writing, song licensing, publishing and A&R, in-house or provided assistance with artist branding and marketing services, in-house or provided assistance with artist booking and tour support, in-house or provided assistance with legal representation, in-house or provided assistance with radio promotion, artist management and distribution, etc.

Figure 6:
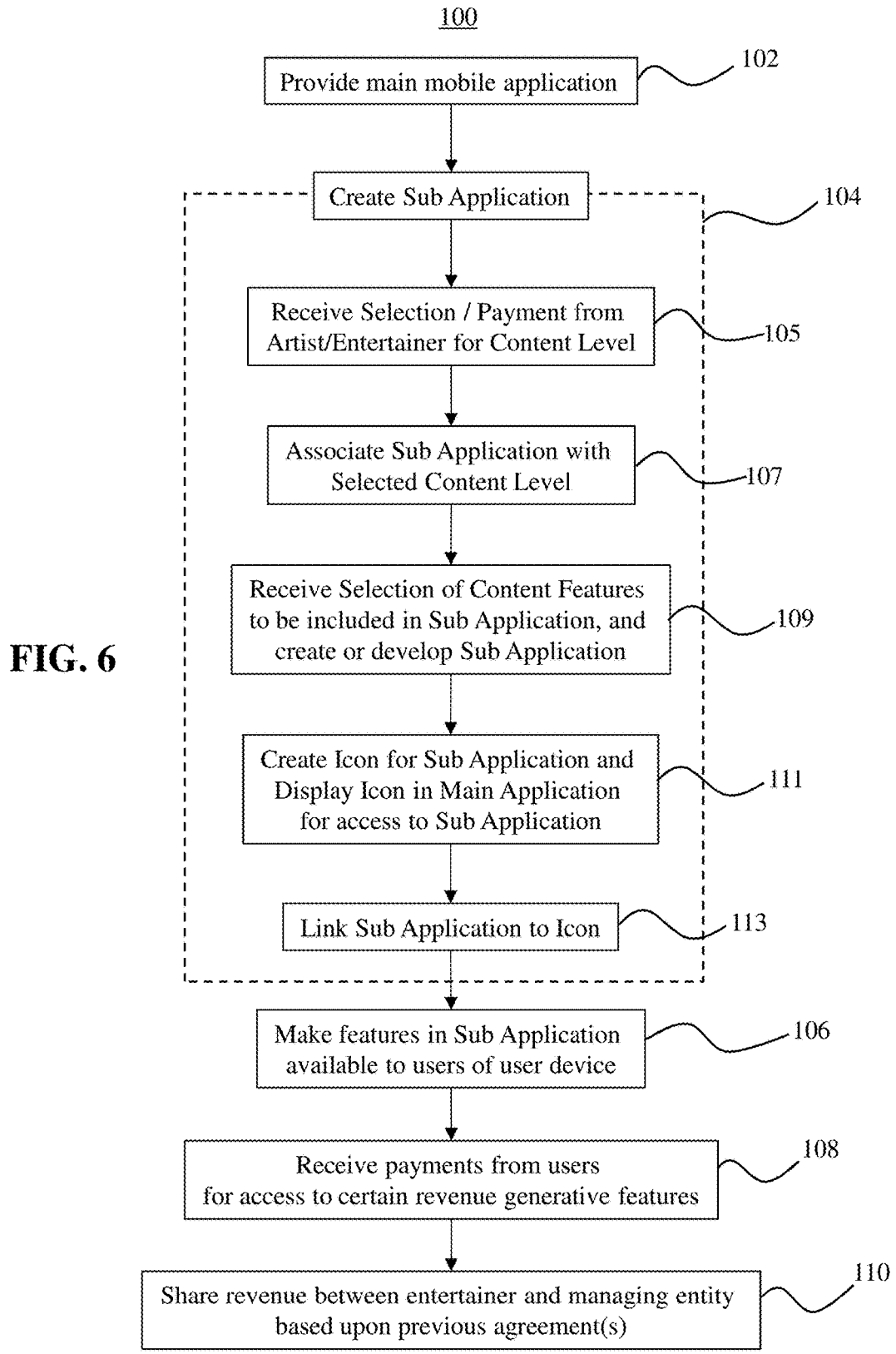
FIG. 6 is a high level flow chart of the method as disclosed in accordance with at least one embodiment of the present invention.

With reference now to FIG. 6, and as mentioned herein, certain embodiments of the present invention are directed to a method 100 for implementing certain features and components described herein. In particular, as referenced at 102, the method 100 of at least one embodiment includes providing a main application 40, which in some cases, can provide or display a list or set of icons or buttons that pertain to different sub applications 50. For instance, clicking on, selecting or activating a sub app icon will provide access to the corresponding sub application 50, e.g., by opening a separate sub application 50, opening a page, module or application within the main application 50, opening a separate web page (either within the main application or via a web browser), or allowing the user to download or install the sub application.

Further, and still referring to FIG. 6, the method 100 include creating or otherwise providing a plurality of sub applications, as referenced by 50, wherein each of the sub applications 50 are associated with and customized by a different artists or entertainer. In order to create or provide the sub application, as shown at 105, the method 100 includes receiving a selection, payment or agreement relative to a content level or tier. For instance, as provided above, in at least one embodiment, the sub application(s) 50 may be associated with a content level which provides access to different sets of features and/or revenue generating features available to the entertainer for incorporation into the sub application. Particularly, once the content level is selected, the method 100 will associate the sub application with the selected content level 107, thereby providing access to the corresponding set of features or revenue generating features.

Next, at 109, the entertainer will begin to design the sub application, whether with a fully customizable layout or via a template, by selecting and adding certain predefined features from the appropriate to available set of features. This may be conducted through a design team, whether in-house or third party, or by the entertainer directly, if so desired.

The method 100 further includes creating an icon, button or other linkable item 111 and linking the sub application to the icon, button or item 113—the item being displayed and made available in the main application 40. This allows users to browse the main application 40, and when he or she sees an icon or item linked to a desired entertainer, the user can click on the item or icon and access the corresponding sub application.

With reference to 106 in FIG. 6, the method 100 further includes making the revenue generating features available for the users via the sub application—for example, some of the revenue generating features may include providing creative content (e.g., songs, music, videos, etc.) available for download or streaming in exchange for payment, selling merchandise, tickets for live events, access to social media accounts, etc. The user(s) can then provide payment for certain features 108, if so desired, and in some embodiments, the method 100 includes sharing the revenue received from the revenue generating features between the entertainer 14 and the managing entity 16. In this manner, the managing entity may take a certain agreed-upon percentage, and the rest would be deposited into the entertainer's selected bank account.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A mobile-based creative content distribution method, comprising:
    under control of at least one processor, performing the steps comprising:
        providing a main mobile application accessible by a plurality of mobile-based user devices,
        providing a plurality of sub applications accessible by the plurality of mobile-based user devices, wherein each of the plurality of sub applications are associated with and at least partially customizable by a corresponding entertainer, and wherein the plurality of sub applications are accessible within the main mobile application,
        for each of the plurality of sub applications, providing a plurality of features for access by the plurality of mobile-based user devices, the plurality of features being selected by the corresponding entertainer, wherein at least some of the plurality of features comprise revenue generating features requiring a purchase by a user of the plurality of mobile-based user devices,
        defining the plurality of features as comprising access to creative content performed by the corresponding entertainer for a corresponding fee,
        defining a plurality of content levels selectable by the corresponding entertainer, the plurality of content levels comprising a different set of the revenue generating features available for a corresponding one of the plurality of sub applications,
        associating one of the plurality of content levels with the corresponding one of the plurality of sub applications upon receipt of a selection and payment by the corresponding entertainer, and
        wherein the plurality of content levels comprise a first tier and a second tier, wherein the first tier comprises a first set of revenue generating features available for incorporation into the corresponding one of the plurality of sub applications, and wherein the second tier comprises a second set of revenue generating features available for incorporation into the corresponding one of the plurality of sub applications.

2. The method as recited in claim 1 further comprising defining the first set of revenue generating features as comprising music available for download in exchange for payment and music available for streaming in exchange for payment.

3. The method as recited in claim 2 further comprising defining the first set of revenue generating features as further comprising merchandise available for purchase.

4. The method as recited in claim 3 further comprising defining the first set of revenue generating features as comprising live content available for purchase.

5. The method as recited in claim 4 further comprising defining the second set of revenue generating features as comprising social media content available for viewing.

6. The method as recited in claim 5 further comprising defining the second set of revenue generating features as comprising providing advertising space on the corresponding one of the plurality of sub applications.

7. A mobile-based creative content distribution method, comprising:
under control of at least one processor, performing the steps comprising:
providing a plurality of sub applications accessible by a plurality of mobile-based user devices, wherein each of the plurality of sub applications are associated with and at least partially customizable by a corresponding entertainer,
for each of the plurality of sub applications, providing a plurality of features for access by the plurality of mobile-based user devices, the plurality of features being selected by the corresponding entertainer, wherein at least some of the plurality of features comprise revenue generating features requiring a purchase by a user of the plurality of mobile-based user devices,
defining the plurality of revenue generating features as comprising access to creative content performed by the corresponding entertainer for a corresponding fee,
defining a plurality of content levels selectable by the entertainer and associating the selected content level with a corresponding one of the plurality of sub applications, wherein the plurality of content levels each comprise a different set of revenue generating features available for incorporation into the corresponding one of the plurality of sub application,
wherein the plurality of content levels comprise a first tier and a second tier each comprising a different required amount of payment by the entertainer and wherein the first tier comprises a first set of revenue generating features available for incorporation into the corresponding one of the plurality of sub applications and wherein the second tier comprises a second set of revenue generating features available for incorporation into the corresponding one of the plurality of sub applications.

8. The method as recited in claim 7 further comprising a main mobile application accessible by the plurality of mobile-based user devices, wherein the plurality of sub applications are accessible within the main mobile application via corresponding icons.

9. The method as recited in claim 8 wherein the corresponding icons are selected by the entertainer associated with the corresponding sub application.

10. A mobile-based creative content distribution method, comprising:
under control of at least one processor, performing the steps comprising:
providing a main mobile application accessible by a plurality of mobile-based user devices, wherein the main mobile application is provided by a managing entity,
providing a plurality of sub applications accessible by the plurality of mobile-based user devices, wherein each of the plurality of sub applications are associated with and at least partially customizable by a corresponding entertainer, and wherein the plurality of sub applications are accessible within the main mobile application,
for each of the plurality of sub applications, providing a plurality of features for access by the plurality of mobile-based user devices, the plurality of features being selected by the corresponding entertainer, wherein at least some of the plurality of features comprise revenue generating features requiring a purchase by a user of the plurality of mobile-based user devices, and wherein at least some of the plurality of features further comprise providing geofencing push notifications to a plurality of user devices located within a defined geographical area,
wherein the revenue generating features comprise music available for download, music available for streaming, merchandise available for purchase, live content available for purchase, and access to social media content associated with the entertainer,
wherein the managing entity receives a portion of at least some of the revenue generated via the revenue generating features,
wherein each of the plurality of sub applications comprise at least one of the revenue generating features,
further defining the plurality of features as comprising access to creative content performed by the corresponding entertainer for a corresponding fee,
defining a plurality of content levels selectable by the corresponding entertainer, the plurality of content levels comprising a different set of the plurality of features available for a corresponding one of the plurality of sub applications,
associating one of the plurality of content levels with the corresponding one of the plurality of sub applications upon receipt of a selection and payment by the corresponding entertainer, and
wherein the plurality of content levels comprise a first tier and a second tier, wherein the first tier comprises a first set of features available for incorporation into the corresponding one of the plurality of sub applications, and wherein the second tier comprises a second set of features available for incorporation into the corresponding one of the plurality of sub applications.

* * * * *